United States Patent

Hanyu

Patent Number: 5,611,023
Date of Patent: Mar. 11, 1997

[54] APPARATUS AND METHOD FOR PROCESSING TWO-TONE IMAGE DATA SO AS TO SMOOTH AND MAGNIFY IMAGE

[75] Inventor: Yoshiaki Hanyu, Souka, Japan

[73] Assignee: Ricoh Company, Ltd., Tokyo, Japan

[21] Appl. No.: 379,945

[22] Filed: Jan. 27, 1995

Related U.S. Application Data

[63] Continuation-in-part of Ser. No. 115,148, Sep. 2, 1993.

[30] Foreign Application Priority Data

| Sep. 2, 1992 | [JP] | Japan | 4-234593 |
| Feb. 1, 1994 | [JP] | Japan | 6-010563 |
| Feb. 2, 1994 | [JP] | Japan | 6-010792 |

[51] Int. Cl.⁶ ............... G06T 3/00; G06T 5/00; H04N 1/387
[52] U.S. Cl. .......... 395/109; 358/447; 382/269; 382/299
[58] Field of Search ............... 395/109, 102; 358/447, 448, 451, 455, 456, 458, 462, 298; 382/205, 269, 299, 209

[56] References Cited

U.S. PATENT DOCUMENTS

| 4,434,431 | 2/1984  | Ohkubo et al.   | 358/298 |
| 4,437,122 | 3/1984  | Walsh et al.    | 358/447 |
| 4,578,713 | 3/1986  | Tsao et al.     | 358/456 |
| 4,668,995 | 5/1987  | Chen et al.     | 358/462 |
| 5,016,118 | 5/1991  | Nannichi        | 358/462 |
| 5,025,325 | 6/1991  | Hudson          | 358/447 |
| 5,117,294 | 5/1992  | Yano            | 358/447 |
| 5,140,441 | 8/1992  | Sugiura et al.  | 358/456 |
| 5,282,057 | 1/1994  | Mailloux et al. | 358/451 |
| 5,359,423 | 10/1994 | Loce            | 358/296 |
| 5,387,985 | 2/1995  | Loce et al.     | 358/447 |
| 5,440,407 | 8/1995  | Overton         | 358/447 |
| 5,483,355 | 1/1996  | Overton         | 358/447 |
| 5,528,704 | 6/1996  | Parker et al.   | 382/299 |

FOREIGN PATENT DOCUMENTS

| 199502  | 10/1986 | European Pat. Off. | G09G 1/16 |
| 336776  | 10/1989 | European Pat. Off. | H04N 1/393 |
| 4011758 | 4/1993  | Germany            | H04N 1/387 |

*Primary Examiner*—Scott A. Rogers
*Attorney, Agent, or Firm*—Lowe, Price, LeBlanc & Becker

[57] ABSTRACT

An apparatus processes two-tone image data so as to magnify a relevant image and smooth a boundary line between a zone consisting of first-tone pixels of two-tone pixels constituting the relevant image and a zone consisting of second-tone pixels of the two-tone pixels. The apparatus is characterized in that the apparatus comprises a unit which, for each two-tone pixel of the two-tone pixels, determines a template pattern, from among a plurality of template patterns, as matching a pixel arrangement comprising pixels located around the each two-tone pixel; and a unit for converting the each two-tone pixel into either single multiple-tone pixel of plurality of multiple-tone pixels, the unit using a result of the determination performed by the unit for the converting.

14 Claims, 9 Drawing Sheets

| | MAGNIFICATION (TIMES) | | |
|---|---|---|---|
| PRINTER RESOLUTION / FAX IMAGE | 300dpi (12×12) | 400dpi (16×16) | 600dpi (24×24) |
| 8 × 3.85 | 1.5 × 3 | 2 × 4 | 3 × 6 |
| 8 × 7.7 | 1.5 × 1.5 | 2 × 2 | 3 × 3 |
| 16 × 15.4 | | 1 × 1 | 1.5 × 1.5 |

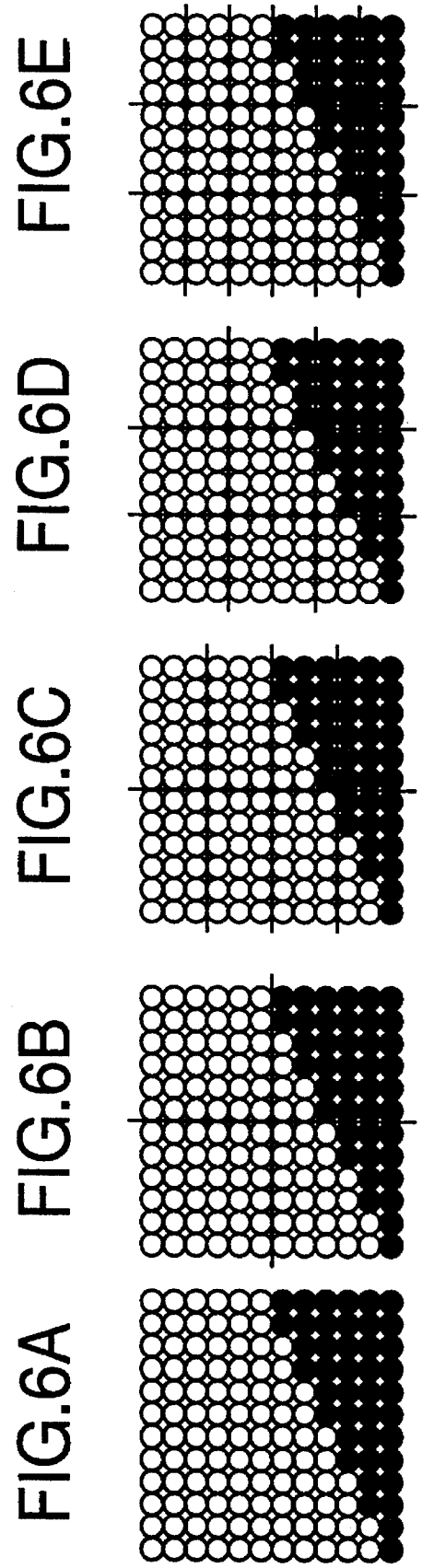

→ P×4/9

| P×0/9 | P×0/9 |
|---|---|
| P×4/9 | P×7/9 |

| P×0/9 | P×0/9 |
|---|---|
| P×0/9 | P×0/9 |
| P×0/9 | P×4/9 |
| P×4/9 | P×9/9 |

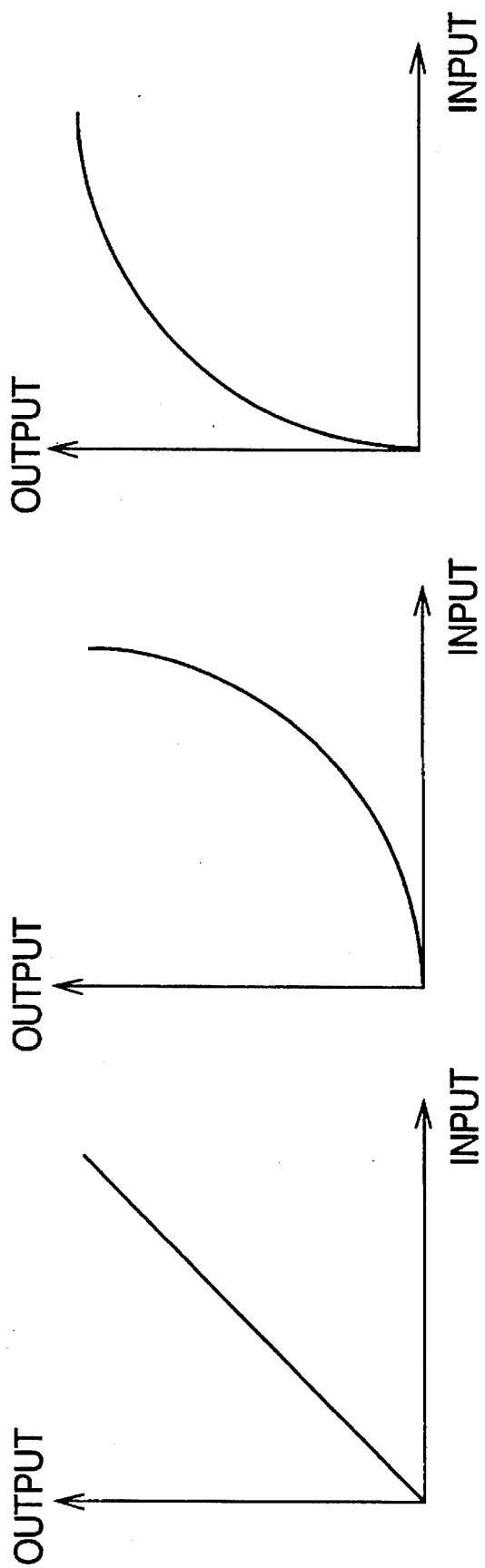

APPARATUS AND METHOD FOR PROCESSING TWO-TONE IMAGE DATA SO AS TO SMOOTH AND MAGNIFY IMAGE

This application is a continuation-in-part of application Ser. No. 08/115,148 filed Sep. 2, 1993.

BACKGROUND OF THE INVENTION

1. Field of the Invention

The present invention relates to an apparatus and a method for processing two-tone image data so as to smooth and magnify a relevant image. The above-mentioned apparatus and method may be applied to an image processing apparatus such as a facsimile apparatus, a digital duplicator having a facsimile function, a digital duplicator not having the facsimile function, a printer such as an optical printer such as a laser printer, and so forth. Data to be processed by the apparatus or method is, for example, data such as that received through the facsimile function. The above-mentioned smoothing of a relevant image is removing jaggies or aliasing from the relevant image. The jaggies or aliasing means "stairsteps" undesirably appearing in inclined lines and curves of an image when the image is represented at a relatively low resolution. The stairsteps are a series of steps consisting of a line such as a boundary line between a zone consisting of white pixels and a zone consisting of black pixels in an image and are like steps of a stair.

2. Prior Art

A smoothing technique will now be described. The smoothing technique is used in processing given two-tone image data so as to magnify a relevant image an integer number of times. In such processing, a group of pixels located around a relevant pixel in the image are used as data to determine a manner in converting the relevant pixel into a plurality of pixels. Hereinafter, converting each pixel into a plurality of pixels will be referred to as magnifying the pixel. Further, an operation to be performed on an image such that a number of pixels (dots) constituting the image is increased will be referred to as magnifying of the image. As a result of such magnifying, it is possible to smoothly interpolate between steps of the jaggies which appear as a result of the magnifying. In this technology, output data is also two-tone image data. Such a technology has been made practicable in a facsimile apparatus in commercial use.

Another technique is for removing the jaggies applicable to a printer or the like having a capability of printing in a multiple-tone printing manner. The technique attempts to obtain high-quality images as a result of converting pixels consisting of the jaggies in an image represented by two-tone image data into pixels represented by multiple-tone image data. A typical technique of the above-described technique was made practicable as a Resolution Enhanced Technology (which will be abbreviated 'RET', hereinafter) of HP (Hewlett-Packard). Further, similar techniques have been made practicable by other printer manufacturers.

Recently, a product such as that having a block structure shown in FIG. 1 has appeared on the market.

The product is a system having a printer 1, a scanner 2, and a modem 3 so as to constitute a digital duplicator having a facsimile function. The system performs a digital duplicating function of reading in an original image through the scanner 2 and printing out the thus-read-in image through the printer 1. Latest digital duplicators have a function of printing an image in the multiple-tone printing manner as mentioned above. The digital duplicating function is an essential function of the system. Further, the system has a printer function of printing out a document produced by a word processing function of a computer 4 connected to the printer 1. The system further has a network function of printing out data obtained through a network 5 connected to the printer 1. The network function also includes a function of transferring an image to the network 5, the image having been read in through the scanner 2. The system further has a scanner function of storing images obtained through the scanner 2 in a file 6 (a recording medium such as an optical disc having a huge data storing capacity) and thus forming a data base of the thus-stored images. The system further has a facsimile function of communicating facsimile images through a public line 7 which connects the modem 3 with a facsimile machine 8.

FIG. 2 shows magnifications required in magnifying one of three different sorts of images, which have been transmitted through facsimile transmission methods, so as to print out the image through one of printers having three different resolutions, 300 dpi, 400 dpi and 600 dpi. In the leftmost column of FIG. 2, indicating resolutions of facsimile reception images, "8×3.85" means "8 (dots/mm)× 3.85 (lines/mm)"; "8×7.7" means "8 (dots/mm)×7.7 (lines/mm)"; and "6×15.4" means "16 (dots/mm)×15.4 (lines/mm)". Similarly, in FIG. 2, the printer resolutions of "300 dpi (12×12)","400 dpi (16×16)" and "600 dpi (24×24)" mean "300 dpi (12 (dots/mm)×12 (lines/mm))", "400 dpi (16 (dots/mm)×16 (lines/mm))" and "600 dpi (24 (dots/mm)×24 (lines/mm))" respectively How FIG. 2 should be viewed will now be described. In an example, if an image of 8×7.7 (second or middle row of FIG. 2) which have been transmitted through a facsimile transmission method is printed through a printer having a resolution capability of 400 dpi (second or middle column of FIG. 2), it is necessary to magnify the image twice in a horizontal direction and twice in a vertical direction that is, 2×2 times.

Why the magnifying is necessary will now be described. If image data of the image of 8 (dots/mm)×7.7 (lines/mm) is used to print out the image through the printer having the resolution capability of 400 dpi (16 (dots/mm)×16 (lines/mm)), each of a horizontal dimension and a vertical dimension of a resulting image is approximately half of a respective one of those of the original image. This is because a number of dots (8) per unit length in the horizontal direction of the original image is ½ of a number of dots (16) per unit length in the horizontal direction of the resulting image, each dot of the original image corresponding to a respective dot of the resulting image. Similarly, a number of lines (7.7) per unit length in the vertical direction of the original image is approximately ½ of a number of line (16) per unit length in the vertical direction of the resulting image, each line of the original image corresponding to a respective line of the resulting image. In order to maintain the dimensions between the original image and the resulting image, it is necessary to magnify, that is, to double the number of dots per unit length in the horizontal direction and to double the number of lines per unit length in the vertical direction of, the original image, before the printing out of the resulting image.

There is demand for system to be devised which simultaneously has a function of image magnifying such as that shown in FIG. 2 and also a function of the above-mentioned RET on the same image data. This system magnifies an image, represented by two-tone image data obtained through the facsimile method, while smoothing the image.

In order to respond to the above-mentioned demand, a certain image processing method may be contrived. The certain image processing method is a method of processing an image represented by two-tone image data and obtained through the facsimile method. The certain image processing method uses a conventional smoothing technique so that an operation of the above-mentioned smoothly interpolating method is performed together with magnifying the image an appropriate number of times. Then, an operation of the RET is performed on the magnified and smoothly interpolated image. Then, the image is printed out in the multiple-tone printing manner.

However, in order to realize the above-described image processing method, it is necessary to use two separate ASICs (Application-Specific Integrated Circuits), specifically, for example, gate arrays, one for the above-mentioned smoothly interpolating operation and the other for the above-mentioned RET operation. Therefore, high costs are required to realize the method. Further, circuit design of the ASICs and/or other peripheral circuits depend on a resolution of a printer which is provided with the ASICs. Since the resolutions of printers are at various levels, it is required that the circuit design be performed in various manners to match the resolutions of the particular printers.

Further, there may be some pixels unexpectedly left without having undergone the smoothly interpolating operation in the smoothing technique for the two-tone image data. The RET operation may not have an effect on the thus-left pixels. As a result, an image, having a part in which a printing quality is degraded, may be obtained. Why the RET operation may not have an effect on the thus-left pixels will now be described. There may be a case where a stairstep part is present in a boundary line between a zone consisting of black pixels and a zone consisting of white pixels. In the stairstep part, a number of pixels constituting each one of the vertical step dimension and the horizontal step dimension is equal to or larger than two. If an image including such a stairstep part is simply magnified by a factor of 2 in both the horizontal and vertical dimensions, the each one of the vertical step dimension and the horizontal step dimension is equal to or larger than four. A possibility of such a stairstep part, having long step dimensions, being appropriately smoothed due to the RET operation is low.

SUMMARY OF THE INVENTION

An object of the present invention is to ensure effective performance of smoothing and magnifying operations on two-tone image data which may consist of data obtained through a facsimile method. Thus, a high printing quality is obtained in an image obtained as a result of printing out the image data which has undergone the performance of the smoothing and magnifying operations. The above-mentioned printing-out is performed through a printer having a capability of printing out an image in the multiple tone printing manner. Further, not only can such a high printing quality be obtained, but also costs required for this purpose can be reduced. Further, the high printing quality can be maintained even if the relevant printers have gamma characteristics different from one another, even if environmental conditions are different among particular printing occasions, and even if characteristics of the printer vary due to aging. The gamma characteristics are characteristics indicating relationship between input image tone values and corresponding output (printed-out) image tone values and are, in general, not linear.

An apparatus for processing two-tone image data according to the present invention magnifies a relevant image and smoothes a boundary line between a zone consisting of first-tone pixels of two-tone pixels constituting said relevant image and a zone consisting of second-tone pixels of said two-tone pixels. The apparatus is characterized in that said apparatus comprises:

means (22) which, for each two-tone pixel of said two-tone pixels, determines a template pattern, from among a plurality of template patterns, as matching a pixel arrangement comprising pixels located around said each two-tone pixel; and means (23) for converting said each two-tone pixel into a plurality of multiple-tone pixels, said means (23) using a result of the determination performed by said means (22) for the converting.

Thus, by using the template patterns, each two-tone pixel can be easily and surely converted into the plurality of multiple-tone pixels. Further, by the conversion, the relevant image can be easily and surely magnified and the boundary line can be easily and surely smoothed. Further, the resulting multiple-tone pixels will be used by a printer which has a capability of printing out a multiple-tone image. As a result, a high-quality image is obtained economically.

According to another aspect of the present invention, said apparatus further comprises:

means (28) for determining a magnification according to which said apparatus magnifies said relevant image;

said means (28), for the determining of the magnification, using image data which is received through a facsimile function and is used to obtain said two-tone image data.

Thereby, it is possible that the magnification is determined such that, with the magnification, an image magnifying operation being performed matches a combination of a type and a transmission resolution mode of a facsimile transmitting apparatus and a resolution of a relevant printer. The relevant printer is used in printing out a resulting image using the multiple-tone pixels. The magnification is such as one of those shown in FIG. 2. The type and transmission resolution mode of the facsimile transmitting apparatus can be detected using the image data which is received through the facsimile function.

According to another aspect of the present invention, said apparatus further comprises:

means (29) for transferring smoothly magnified pixel data to said means (23), which data is previously prepared for said magnification and is used for converting said each two-tone pixel into said plurality of multiple-tone pixels in said means (23).

Thereby, it is not necessary that various kinds of the smoothly magnified pixel data prepared for all possible magnifications be stored in the means (23). Therefore, a memory capacity required in the means (23) can be reduced and thus a cost required for the means (23) can be reduced.

According to another aspect of the present invention, said apparatus further comprises:

means (30) for correcting said smoothly magnified pixel data so as to eliminate a difference between ideal printing-out characteristics and actual printing-out characteristics.

This correction may be performed based on gamma characteristics of the relevant printer, environment variation such as ambient temperature variation, characteristics variation of a photosensitive substance drum and so forth in the printer due to aging thereof. As a result, it is possible that a high-quality printed-out image is always obtained, which image has optimum tone characteristics. This is achieved by eliminating effects caused the gamma characteristics of the relevant printer, environment variation such as ambient temperature variation, characteristics variation of a photosensitive substance drum and so forth in the printer due to aging thereof.

A method for processing two-tone image data according to another aspect of the present invention is characterized in that said method comprises steps of:

(a) determining, for each two-tone pixel of said two-tone pixels, a template pattern, from among a plurality of template patterns, as matching a pixel arrangement comprising pixels located around said each two-tone pixel; and (b) converting said each two-tone pixel into multiple-tone pixels, said step (b) using a result of the determination performed by said means (22) for the converting.

Further, said step (b) further comprises steps of:

(b-1) converting said each two-tone pixel into a two-tone dot group;

(b-2) dividing said dot group into either a single division or a plurality of divisions; and (b-3) averaging tones of dots constituting appropriate one of said single division or said plurality of divisions, a result of the averaging constituting tones of said multiple-tone pixels.

Further, said method further comprises steps of:

(c) classifying said plurality of template patterns into a first group of patterns, a second group of patterns and a third group of patterns;

said first group of patterns being used to detect whether said each two tone-pixel is one not to be converted into the multiple-tone pixels;

said second group of patterns being used to detect whether said each two tone-pixel is one not comprising a stairstep part in said boundary line and is to be converted into the multiple-tone pixels;

said third group of patterns being used to detect whether each said two-tone pixel is one comprising said stairstep part in said boundary line and is to be converted into the multiple-tone pixels;

(d) determining a group priority order such that said step (a) uses a group from among said first, second and third groups of patterns in that order; and (e) determining a pattern priority order according to which said step (a) uses a pattern from within each group of said first, second and third groups of patterns.

By applying such a priority order in use of the template patterns, erroneous matching of the template patterns can be prevented. Especially, a certain pixel is prevented from being converted into a halftone multiple-tone pixel. The certain pixel is a pixel which is not to be converted into a halftone multiple-tone pixel, for example, a pixel constituting an end of a straight line in the relevant image. If such a pixel is converted into a halftone multiple-tone pixel, a sharpness in the relevant image may be degraded.

According to another aspect of the present invention, said dot group is commonly used in said step (b-1) for different magnifications of said magnification. As a result, in comparison to a case where a different group of the template patterns is prepared for a different magnification, a number of template patterns can be reduced and preparation of possible duplicate template patterns is eliminated. As a result, the preparation of the template patterns is easy and thus economical.

According to another aspect of the present invention, said step (b-2) divides said dot group into either the single division or the plurality of divisions in accordance with a relevant magnification of said different magnifications; and said dot group comprises a dot pattern such that said tones of said multiple tone pixels obtained in said step (b-3) from said dot group are multiple tones.

For this purpose, said dot group comprises the dot pattern such that appropriate one of said single division and each of said plurality of divisions from said dot group include at least two dots.

Thereby, if any magnifications are applied, each two-tone pixel can be appropriately converted into either a single halftone multiple-tone pixel or a plurality of halftone multiple-tone pixels. As a result, the jaggies in the boundary line are effectively eliminated and thus a fine printed-out image can be obtained.

According to another aspect of the present invention, different patterns of said dot pattern used in said step (b-1) are prepared for various magnifications of said magnification. As a result, it is possible that if any magnification is applied, a pixel is converted into either single multiple-tone pixel or a plurality of multiple-tone pixels, a number of the multiple tones being similar even if the magnification is different. Thus, a high-quality printed-out image can be always obtained.

Other objects and further features of the present invention will become more apparent from the following detailed description when read in conjunction with the accompanying drawings.

BRIEF DESCRIPTION OF DRAWINGS

FIGS. 6A, 6B, 6C, 6D, and 6E illustrate dot-pattern dividing operation examples performed after the magnifying operation illustrated in FIGS. 5A and 5B;

FIGS. 13A, 13B and 13C illustrate ideal gamma characteristics of a relevant printer, an actual gamma characteristic example thereof, and a correction characteristic example therefor.

DESCRIPTION OF THE PREFERRED EMBODIMENTS

A page printer, as a first embodiment of the present invention, having an apparatus for processing two-tone image data according to the present invention and using a method for processing two-tone image data according to the present invention will now be described with reference to FIG. 3. The page printer shown in FIG. 3 may replace the printer 1 shown in FIG. 1.

Figures 1, 2:
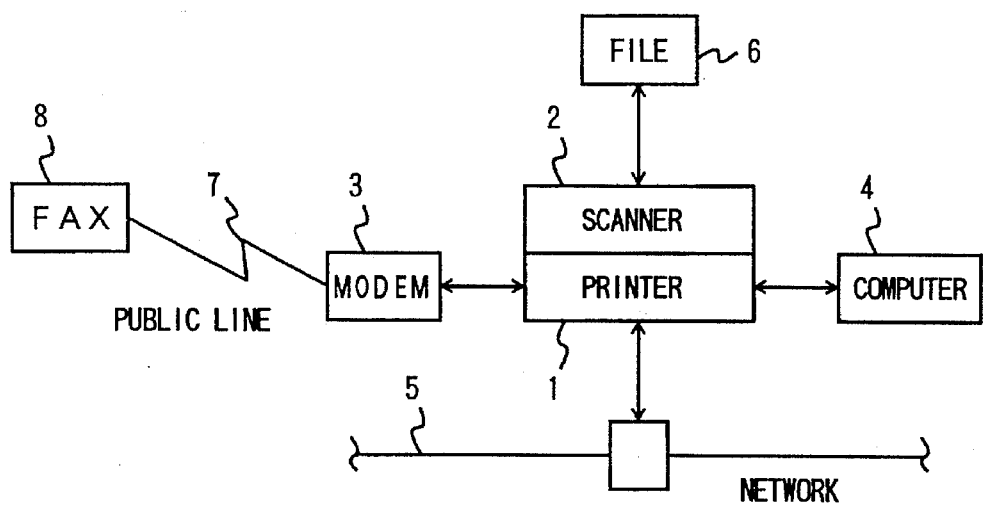
FIG. 1 shows a block diagram of a digital duplicator having a facsimile function in an example of prior art, the present invention being applied to the duplicator.
FIG. 2 shows magnifications according to which images received through the facsimile function are magnified so as to be printed out through printers having various resolution capabilities.

The page printer receives image data via a modem such as the modem 3 shown in FIG. 1. The thus-received image data is data received through the facsimile method. The thus-received image data is input to an I/O device 12 which is controlled by a CPU 11. The thus-input data is stored in a working RAM 13. The thus-stored data is expanded as a result of performing an image reproducing processing on the data, the image reproducing processing being performed using programs previously stored in a ROM 14. The thus-expanded two-tone image data is stored in a page memory 15.

In general, an image is transmitted through facsimile transmission method after undergoing run length compression processing, MR, MMR, or the like. In order to print out the thus-transmitted image, it is necessary to cause the transmitted data to undergo relevant expansion processing, that is, the image reproducing processing.

A printing unit 16 reads the two-tone image data stored in the page memory 15. The thus-read data is processed by a multiple-tone magnifying circuit 17. The circuit 17 thus magnifies, in a predetermined magnification (first predetermined magnification such as that determined through the relationship shown in FIG. 2), an image in a form of the two-tone image data and converts the two-tone image data to multiple-tone image data. Thus, a high-quality printing is achieved. In particular, the multiple-tone magnifying circuit 17 and a part of the above-mentioned CPU 11 act as the apparatus for processing two-tone image data according to the present invention and use the method for processing two-tone image data according to the present invention.

Figure 4:
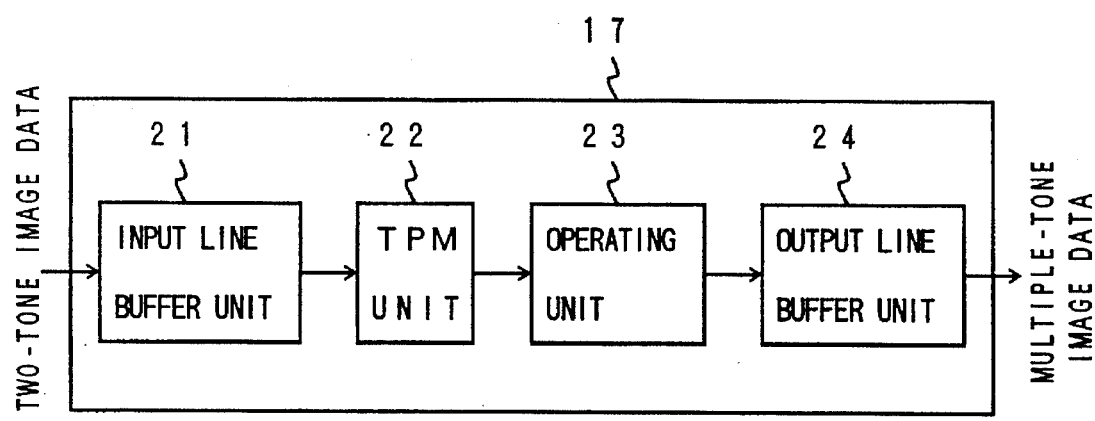
FIG. 4 shows a block diagram example of a multiple-tone magnifying circuit in the printer shown in FIG. 3.

With reference to FIG. 4, a structure example of the multiple-tone magnifying circuit 17 will now be described. An input line buffer unit 21 stores two-tone image data representing a plurality of lines of pixels which include a relevant pixel and pixels surrounding the relevant pixel. A template matching circuit (TPM unit) 22 magnifies the relevant pixel, data of which is stored in the buffer unit 21, in a second predetermined magnification, with the above-described smoothing operation being performed on the relevant pixel. The operation executed by the TPM unit 22 will be described later. Thus, a two-tone magnified dot group is obtained for the relevant pixel. An operating unit 23 divides the two-tone magnified dot group in a manner depending on the above-mentioned first predetermined magnification so as to obtain two-tone dot groups. The operating unit 23 performs an averaging operation on each of the thus-obtained two-tone dot groups. Thus, multiple-tone image data is obtained. The dividing operation and averaging operation will also be described later.

Output of the operating unit 23, that is, the multiple-tone image data, is stored in an output line buffer unit 24. The buffer unit 24 stores a plurality of lines of pixels in a form of the multiple-tone image data. The thus-stored plurality of lines of pixels are output to the printing unit 16 shown in FIG. 3 in synchronization with pixel clock pulses of the printing unit 16.

The multiple-tone magnifying circuit 17 carries out the above-described operations in real time between the page memory 15 and the printing unit 16.

Algorithm of the operations carried out by the above-described multiple-tone magnifying circuit 17 will now be described with reference to FIGS. 5, 6, 7 and 8.

Figure 5A:
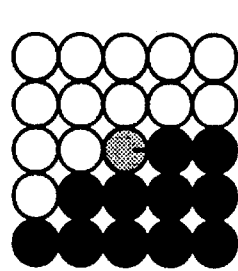
FIGS. 5A and 5B illustrate a magnifying operation example performed by the multiple tone magnifying circuit shown in FIG. 4.

FIG. 5A shows a pixel arrangement including the relevant pixel and 24 pixels surrounding the relevant pixel. The pixel arrangement shown in FIG. 5A is a part of a relevant image represented by an input two-tone image signal. In the pixel arrangement shown in FIG. 5A, the relevant pixel is represented by a circle having light halftone provided therein, the circle being located at the center of the 25 circles. White pixels are represented by empty circles and black pixels are represented by circles having dark halftone provided therein. The representation of the white and black pixels will be made in the same manner for other relevant figures. Further, representation of white dots and black dots will also be made in the same manner for other relevant figures including FIG. 5B.

Figure 5B:
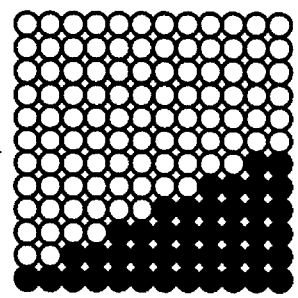

In the algorithm, each of the pixels constituting the relevant image is one by one picked up as being the above-mentioned relevant pixel and, for example, the 24 pixels surrounding the relevant pixel are checked as to how the black pixels and white pixels are arranged. Depending on the thus-checked pixel arrangement of the surrounding pixels and the relevant pixel, the relevant pixel is magnified into a dot group consisting of, for example, 12×12 dots, as shown in FIG. 5B. A dot group such as the thus-obtained 12×12 dots may be referred to as the above-mentioned two-tone magnified dot group. Which number of dots are given for the single relevant pixel is determined according to the above-mentioned second predetermined magnification. The black dot and white dot arrangement in the dot group shown in FIG. 5B is determined so that a shape of a boundary line between the black dots and white dots of the dot group is a shape which results from smoothing a shape of a boundary line between the black pixels and white pixels in the black pixel and white pixel arrangement of the relevant pixel and surrounding pixels shown in FIG. 5A. (The black pixel and white pixel arrangement of the relevant pixel and the surrounding pixels will be simply referred to as the pixel arrangement concerning the relevant pixel, hereinafter. Further, the relevant pixel (s) is (are) converted into the dot group(s) so that a shape of a boundary line between the black dot and white dot of the dot group is a shape which results from smoothing a shape of a boundary line between the black pixels and white pixels in the pixel arrangement concerning the relevant pixel will be simply referred to as the relevant pixel is converted so that an appropriate magnifying and smoothing operation is performed, hereinafter.) As a result of similar appropriate magnifying and smoothing operation being performed on continuous black pixels which constitute the boundary line shown in FIG. 5A, overall outline edges of resulting black dot groups are smoothed. (Such an operation as that in which the outline edge is smoothed will be referred to as 'edge correction', hereinafter.) Thus, the relevant pixel is converted so that an appropriate magnifying and smoothing operation is performed. The above-described operations are carried out by the above-described TPM unit 22 shown in FIG. 4. How the black dot and white dot arrangement of the dot group such as that shown in FIG. 5B is obtained through the TPM unit 22 using template patterns will be described later.

Then, the thus-obtained dot group shown in FIG. 5B is divided into divisions in a manner of manners shown in FIGS. 6A, 6B, 6C, 6D and 6E. Which manner is selected is determined according to the above-mentioned first predetermined magnification. FIG. 6A is selected if the first predetermined magnification is 1×1, that is, no substantial magnifying is performed. FIG. 6B is selected if the first predetermined magnification is 2×2, that is, twice in the horizontal direction and further twice in the vertical direction. FIG. 6C is selected if the first predetermined magnification is 2×4, that is, twice in the horizontal direction and further four times in the vertical direction. FIG. 6D is selected if the first predetermined magnification is 3×3, that is, three times in the horizontal direction and further three times in the vertical direction. FIG. 6E is selected if the first predetermined magnification is 3×6, that is, three times in the horizontal direction and further six times in the vertical direction. The predetermined magnifications correspond to those shown in FIG. 2.

If the first predetermined magnification is 1×1 as mentioned above, the dot group shown in FIG. 5B is treated as a single pixel and the above-mentioned averaging operation is performed on the 12×12 dots shown in FIG. 5B. A tone level of the 12×12 dots is standardized on the basis of a predetermined maximum multiple-tone level P. That is, at first, a number of black dots included in the 12×12 dots is counted. In the example shown in FIG. 5B, the number of black dots is 42. The above-mentioned standardization is performed as shown in the following equation:

$$42/(12\times12)\cdot P=(7/24)P.$$

Thus, the (7/24)P tone level is obtained from the 12×12 dots shown in FIG. 5B. Thus, the averaging operation is performed on the two-tone magnified dot group.

If the first predetermined magnification is 2×2, the 12×12 dots are divided into 4 divisions, as shown in FIG. 6B, each division consisting of 6×6 dots. The 4 divisions correspond to 4 pixels (2×2 pixels) obtained from the relevant pixel shown in FIG. 5A. The averaging operation is performed on each of the 4 divisions as follows: The number of black dots included in each of the 4 divisions is 0, 0, 12 and 30. Then, the averaging operation is performed as shown in the following equations:

$$0/(6\times6)\cdot P=0;$$

$$0/(6\times6)\cdot P=0;$$

$$12/(6\times6)\cdot P=(1/3)P; \text{ and}$$

$$30/(6\times6)\cdot P=(5/6)P.$$

Thus, the resulting 2×2 pixels have multiple-tone levels of 0, 0, (1/3)P and (5/6)P, respectively.

Similarly, if the predetermined first magnification is one of 2×4, 3×3, and 3×6, the 12×12 dot group shown in FIG. 5B is divided into a relevant one of 8 divisions, 9 divisions and 18 divisions, as shown in FIGS. 6C, 6D and 6E. In each case, each division consists of a relevant one of 6×3 dots, 4×4 dots and 4×2 dots, as shown in the figures. In each case, the averaging operation is performed on each of the divisions.

The above-described dividing and averaging operations are carried out by the above-mentioned operating unit 23 shown in FIG. 4.

Figure 7A:
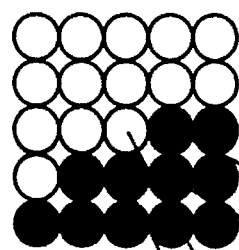
FIGS. 7A and 7B illustrate another magnifying operation example performed by the multiple-tone magnifying circuit shown in FIG. 4.

Further, if the first predetermined magnification is not an integer × an integer, that is, if the magnification is, for example, 1.5×1.5 or 1.5×3, the following method may be applied: The TPM unit 22 treats 4 (2×2) adjacent pixels as relevant pixels at the same time, as shown in FIG. 7A. The 4 relevant pixels are magnified to the dot group of 6×6 dots shown in FIG. 7B. The black dot and white dot arrangement of the dot group shown in FIG. 7B is determined so that the 4 relevant pixels are converted so that an appropriate magnifying and smoothing operation is performed.

Figure 7B:
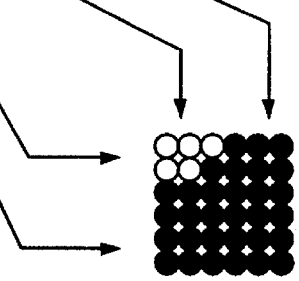
Figure 8A:
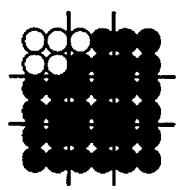
FIGS. 8A and 8B illustrate other dot pattern dividing operation examples performed after the magnifying operation illustrated in FIGS. 7A and 7B.
Figure 8B:
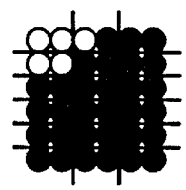

Then, the operating unit 23 divides the thus-obtained dot group shown in FIG. 7B into 9 divisions, each division consisting of 2×2 dots, as shown in FIG. 8A, in the case the magnification is 1.5×1.5; or into 18 divisions, each division consisting of 2×1 dots, as shown in FIG. 8B, in the case the magnification is 1.5×3. Thus, the 2×2 relevant pixels are magnified into 9 (3×3) in the former case. Thus, a number of pixels is increased 1.5×1.5 times. Similarly, the 2×2 relevant pixels are magnified into 18 (3×6) in the latter case. Thus, a number of pixels is increased 1.5×3 times. In each case, the operating unit 23 performs the averaging operation on each division. Thus, the multiple-tone levels are obtained for a number of pixels which have been obtained as a result of magnifying in the first predetermined magnification.

How the black dot and white dot arrangement of the dot group such as that shown in FIG. 5B is obtained through the TPM unit 22 using template patterns will now be described. The dot group is obtained as a result of determining which of previously stored template patterns matches the pixel arrangement concerning the relevant pixel such as that shown in FIG. 5A.

FIGS. 9A, 9B, 9C, 9D and 9E show 5 groups of the above-mentioned template patterns TP in an example. Each template pattern of the template patterns TP consists of 5×5 pixels as shown in the figures. In each template pattern TP, a pixel located at the exact center in the 5×5 pixels is the above-mentioned relevant pixel as that shown in FIG. 5A. The 5 groups of template patterns TP are previously stored in a memory of the TPM unit 22. Dot patterns DP shown in FIGS. 9A, 9B, 9C, 9D and 9E are used to obtain a two-tone magnified dot group such as that shown in FIG. 5B for the relevant pixel from the black pixel and white pixel arrangement of the relevant pixel and the surrounding pixels such as that shown in FIG. 5A. Each pattern of the dot patterns DP consists of 8×8 dots while the dot group shown in FIG. 5B consists of 12×12 dots. Such difference in dot formations does not matter but is merely due to design choice. If a pattern of the template patterns TP is determined as matching the pixel arrangement concerning the relevant pixel, a dot pattern, among the dot patterns DP, accompanying the thus-determined template pattern in FIGS. 9A–9E is determined to be the two-tone magnified dot group for the relevant pixel.

In each of the template patterns TP shown in FIGS. 9A, 9B, 9C, 9D, and 9E, each empty circle represents a white pixel; each circle having dark halftone provided therein represents a black pixel; and each circle having light halftone provided therein represents a pixel which may be either a black pixel or a white pixel, that is, a pixel of DON'T CARE.

Figure 9A:
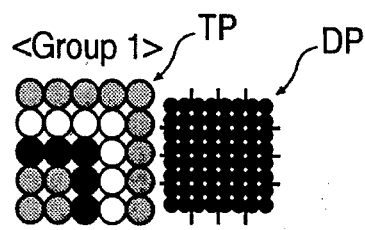
FIGS. 9A, 9B, 9C, 9D, and 9E illustrate groups of template pattern examples accompanied by dot pattern examples used in the multiple-tone magnifying circuit shown in FIG. 4.
Figure 9B:
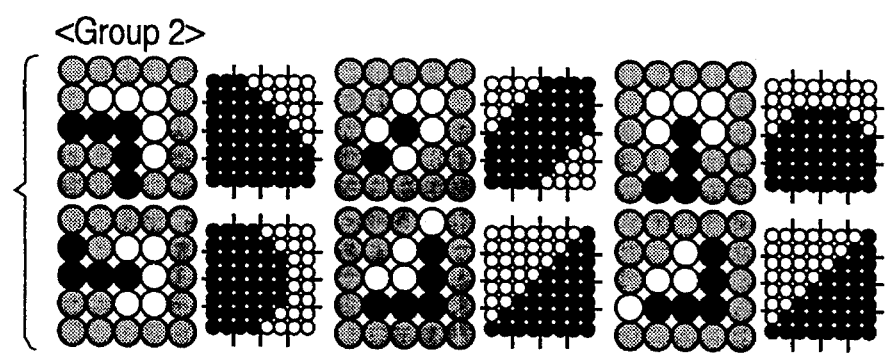
Figure 9C:
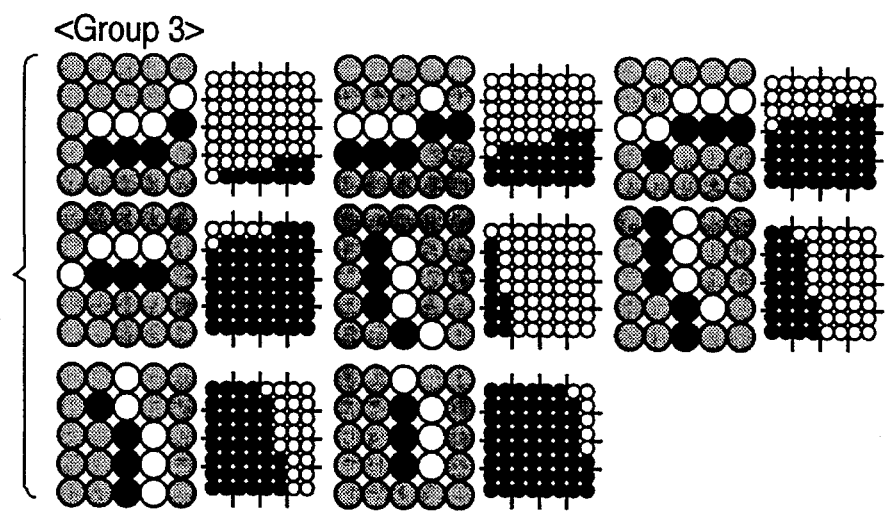
Figure 9D:
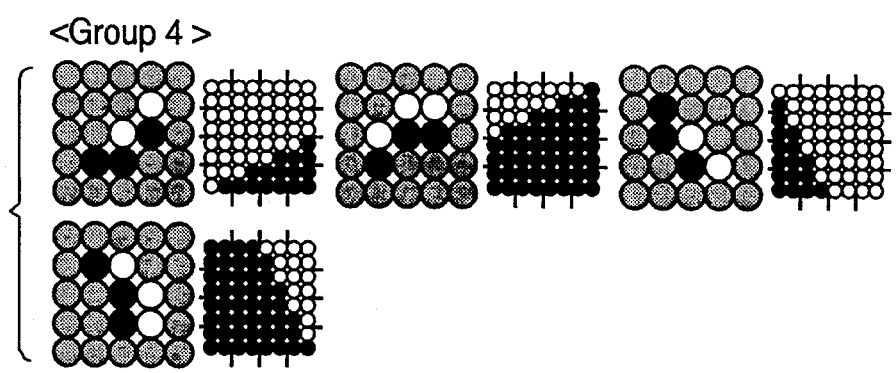
Figure 9E:
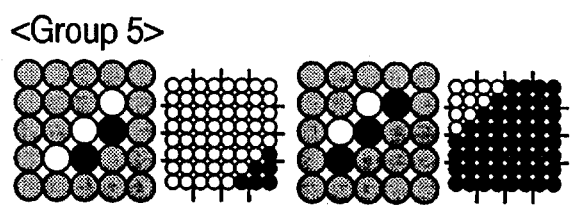

The above-described groups of template patterns shown in FIGS. 9A–9E consist of a group 1 shown in FIG. 9A, a group 2 shown in FIG. 9B, a group 3 shown in FIG. 9C, a group 4 shown in FIG. 9D and a group 5 shown in FIG. 9E.

The group 1 template pattern TP is used to detect a relevant pixel which is not to be converted into a multiple-tone pixel even through the multiple-tone magnifying circuit 17 shown in FIG. 4. Such a relevant pixel is, for example, a pixel whereby a possibility of the pixel constituting a vertex of an angular end of a straight line having a thickness in a relevant image is high.

The groups 2, 3, 4 and 5 of the template patterns TP are used to detect a relevant pixel which is to be converted into a multiple-tone pixel through the multiple-tone magnifying circuit 17. Further, the group 2 template patterns TP are used to detect a relevant pixel whereby a possibility of the pixel not constituting a stairstep part in the relevant image is high. Such a relevant pixel is a pixel, a possibility of the pixel constituting, for example, an intermediate part of an oblique line in the relevant image, or a vertex of an acute angle outline in the relevant image, is high. A basic stairstep part comprises a first part extending along the scan line direction; a second part extending, from an extending end of the first part, along perpendicularly to the scan line direction; and a third part extending, from an extending end of the second part, along the scan line direction. The oblique line is a line extending obliquely to the scan line direction.

The groups 3, 4, 5 of the template patterns TP are used to detect a relevant pixel whereby a possibility of the pixel constituting the stairstep part in the relevant image is high. The group 3 template patterns TP are used to detect either a black pixel or a white pixel constituting the stairstep part which has a step interval of 3 pixels. The step interval is a number of pixels straightly arranged between two adjacent step changes. The group 4 template patterns TP are used to detect either a black pixel or a white pixel constituting the stairstep part which has a step interval of 2 pixels. The group 5 template patterns TP are used to detect either a black pixel or a white pixel constituting the stairstep part which has a step interval of one pixel.

The memory of the TPM unit 22 storing the above-described groups of the template patterns TP and dot patterns DP may also store other template patterns with accompanying dot patterns. The other patterns are obtained as a result of left and right reflections, top and bottom reflections, left and right and also top and bottom reflections of the patterns. The other patterns may also include patterns other than those mentioned above.

A priority order is predetermined among the above-mentioned 5 groups 1, 2, 3, 4 and 5 of the template patterns TP shown in FIGS. 9A through 9E. The priority order is an order according to which group of the 5 groups is used in determining whether or not the template patterns TP of the group match the pixel arrangement concerning the relevant pixel represented by the input two-tone image signal. The priority order is an order in which a group having a smaller group number is used earlier than a group having a larger group number. That is, the group 1 template pattern TP is used first and the group 5 template patterns TP are used last.

Further, a similar priority order is predetermined within template patterns TP belonging to each group of the 5 groups. Therefore, if it is determined that each of a plurality of template patterns TP matches the pixel arrangement of the input two-tone image signal, it is possible to select one template pattern from among the plurality of template patterns. Thus, in such a situation that each of the plurality of template patterns matches the pixel arrangement of the input two-tone image signal, an operation of the selection of a single template pattern from among the 5 groups of template patterns is not at a deadlock.

There may be a case where, in the above-described embodiment of the present invention, that the template pattern TP of the group 1, to which the highest priority order is assigned, matches the pixel arrangement of the input two-tone image signal. In such a case, it is highly possible that a relevant pixel is a pixel constituting a vertex of an angular end of a straight line in a relevant image. In such a case, the smoothing and magnifying operation is performed as shown in FIG. 9A. Thus, in the resulting dot pattern DP shown in FIG. 9A, all dots of the 8×8 dots are black dots.

In such a case, the above-described averaging operation is performed on the dot pattern DP through the operating unit 23. However, since all the dots are black dots as mentioned above, the maximum tone level is obtained as a result of performing the averaging operation. The averaging operation may be performed on whole 8×8 dot pattern DP. Instead, the averaging operation may be performed on each of dot patterns obtained as a result of dividing, as shown in FIGS. 6B–6E, the above-mentioned 8×8 dot pattern DP. The above-mentioned dividing operation is performed according to an appropriate magnification such as that shown in FIG. 2. However, in each case, since all the dots constituting the dot pattern DP are black dots, the averaging operation results in the maximum tone levels (the above-mentioned maximum multiple-tone level P of the relevant printer). Thus, in such a case, the tone of the relevant pixel is not converted into a middle tone among the multiple tones. That is, no substantial edge correction as described above is performed on the relevant pixel. As a result, sharpness of a vertex of an angular end of a straight line in a relevant image is prevented from being degraded. The sharpness degradation may occur if a tone of such a relevant pixel was converted into a middle tone among the multiple tones.

Further, the group 2 template patterns TP shown in FIG. 9B includes template patterns which may match the pixel arrangement of the input two-tone image signal having the relevant pixel constituting a vertex of an angular end, that is, which template patterns TP may detect a vertex of an angular end. For example, the top leftmost template pattern among those shown in FIG. 9B may detect a vertex of an angular end. As a result, it may be that the relevant pixel constituting a vertex of an angular end is detected by the group 1 template pattern TP and also is detected by some of the group template patterns TP. However, the group 1 has the priority order higher than that of the group 2 as mentioned above. Therefore, the smoothing and magnifying operation according to the group 2 shown in FIG. 9B may be performed only on the relevant pixels, the pixel arrangements of which relevant pixels do not match the template pattern TP of the group 1. Further, the relevant pixel detected by the group 1 template pattern TP is surely prevented from undergoing the edge correction operation. As shown in FIG. 9B, each of the dot patterns DP includes white dots. Therefore, the smoothing and magnifying operation according to the group 2 constitutes the edge correction operation.

The dot patterns DP accompanying the template patterns TP belonging to the group 2 shown in FIG. 9B are suitable for appropriately performing the smoothing and magnifying operation on the relevant pixels constituting an end point of a 45° oblique line, or a vertex of an acute angle pattern in the horizontal direction which is a vertex projecting horizontally, or a vertex of an acute angle pattern in the vertical direction which is a vertex projecting vertically, in the relevant image. The bottom leftmost template pattern among those shown in FIG. 9B is one for detecting a pixel constituting a vertex of an acute angle pattern in the horizontal direction. The top rightmost template pattern among those shown in FIG. 9B is one for detecting a pixel constituting a vertex of an acute angle pattern in the vertical direction.

The template patterns TP belonging to the groups 3, 4 and 5 shown in FIGS. 9C, 9D and 9E are those which are used to detect pixels constituting the stairstep part. The lower priority order is assigned to the template pattern TP which is used to detect a pixel constituting the stairstep part having a step interval of a smaller number of pixels. The higher priority order is assigned to the template pattern TP which is used to detect a pixel constituting the stairstep part having a step interval of a larger number of pixels. By such assignment of the priority orders, erroneous stairstep part detection can be easily prevented. The dot patterns DP accompanying the template patterns TP belonging to the groups 3, 4 and 5 shown in FIGS. 9C, 9D and 9D are suitable for appropriately performing the smoothing and magnifying operation on the relevant pixels constituting the stairstep parts.

Why erroneous stairstep part detection can be easily prevented as mentioned above will now be described. It may be that a same image pattern is be detected sing, for example, the top leftmost template pattern of those shown in FIG. 9D, which is used to detect two pixel interval stairstep parts, and also detected using, for example, the top middle template pattern of those shown in FIG. 9C, which is used to detect three pixel interval stairstep parts. In this example case, image patterns which are detected using the top leftmost template pattern in FIG. 9D include all of image patterns which are detected using the top middle template pattern in FIG. 9C. Therefore, if the priority of the top leftmost pattern of FIG. 9D were higher than the top middle pattern of FIG. 9C, no image pattern would remain after the top leftmost pattern of FIG. 9D is used to detect image patterns. As a result, three pixel interval stairstep parts could not be detected. In order to eliminate such a problem, it is possible to design template patterns such that there is no possibility of arising of such a problem. However, if such template patterns were designed, a number of template patterns should be increased, thus being problematic. By simply making higher a priority of template patterns for detecting shorter pixel interval stairstep parts, the problem can be eliminated. The eliminated problem is one that longer pixel interval stairstep parts could not be detected.

These template patterns TP used by the TPM unit 22 and the dot patterns DP used by the operating unit 23 can be used in common for all the magnifications which the relevant system requires as shown in FIG. 2.

In this case, a relevant dot pattern DP of the dot patterns DP shown in FIGS. 9A–9E is divided according to a relevant magnification. The dividing of a dot pattern according to a relevant magnification is performed as shown in FIGS. 6B, 6C, 6D and 6E. There is a condition that, after the dividing, each pixel including an edge part of a relevant image has to be converted into a middle tone of the multiple tones. The above-mentioned edge part is a part in which black dots come into contact with white dots at a stairstep boundary line. Each pixel after the dividing is a pixel consisting of a relevant division of the dot pattern. In the example of FIGS. 9B–9E, a maximum possible dividing which fulfills the above-mentioned condition is at least dividing such that each division consists of 2×2 dots as shown in the drawings. Each 2×2 dot group constitutes a pixel after the dividing.

Figures 10A, 10B, 10C, 10D:
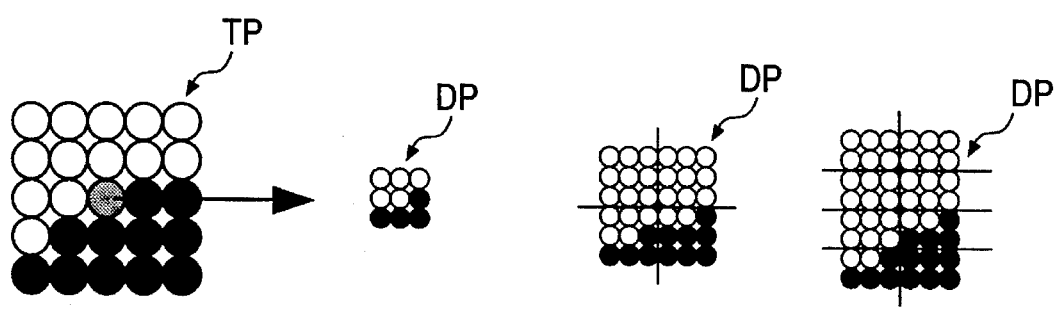
FIGS. 10A, 10B, 10C and 10D illustrate a template pattern example accompanied by dot pattern examples particularly prepared for various magnifications, which examples may be used in the multiple-tone magnifying circuit shown in FIG. 4.

However, in another structure example of the multiple-tone magnifying circuit 17, dot patterns DP are not commonly used for all the magnifications but a different dot pattern is prepared for each magnification as shown in FIGS. 10A–10D. The dot patterns DP shown in FIGS. 10B, 10C and 10D are prepared for the template pattern TP shown in FIG. 10A. Further, the dot patterns DP shown in FIGS. 10B, 10C and 10D are prepared for magnifications of 1×1, 2×2 and 2×4, respectively. The magnification 1×1 means no substantial magnifying is performed. In FIG. 10A, the relevant pixel in the pixel arrangement concerning the relevant pixel is indicated as a center circle having light halftone provided therein. This indication is also applied to FIG. 11A.

When a magnification to be used is determined among the magnifications, for example, 1×1, 2×2 or 2×4, as mentioned above, only dot patterns relevant to the thus-determined magnification are stored in a memory of the operating unit 23 so that a relevant dot pattern DP stored therein can be read out for each template pattern TP. The thus-stored relevant dot patterns are obtained as a result of being transferred by multiple-tone data transfer means 29 which will be described later.

Such a first system in which different dot patterns DP are prepared for various magnifications will now be compared with a second system in which a common dot pattern DP is used for various magnifications as mentioned above. For the first system, extra design works and costs are disadvantageously required to prepare the different dot patterns DP. However, it is possible to maintain a number of dots constituting a pixel obtained through the smoothing and magnifying operation, to be numbers not less than a predetermined value. In the example of FIGS. 10A, 10B, 10C, and 10D, the number of dots constituting the pixel is 9 for each of the magnifications 1×1 and 2×2, as shown in FIGS. 10B, 10C, and 6 for the magnification 2×4 as shown in FIG. 10D. Thus, the pixel can be a halftone or middle tone multiple-tone pixel appropriately and thus a tone level of the pixel can be finely controlled. Further, a high-quality image can be obtained through converting the two-tone image into the multiple-tone image.

Figures 11A, 11B, 11C, 11D:
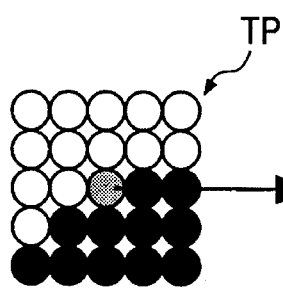
FIGS. 11A, 11B, 11C and 11D illustrate a template pattern example accompanied by pixel multiple-tone value examples particularly prepared for various magnifications, which examples may be used in the multiple-tone magnifying circuit shown in FIG. 4.

Instead of preparing the different dot patterns DP for various magnifications, it is also possible that a different tone value of a pixel be specially prepared for a each magnification as shown in FIGS. 11B–11D. Each of the above-mentioned dot patterns DP or tone values of a pixel will be generally named 'smoothly magnified pixel data'.

In this case, the smoothing and magnifying operation includes the averaging operation. If the template pattern TP is determined for the pixel arrangement concerning the relevant pixel, tone values accompanying the thus-determined template pattern TP are determined for the relevant pixel. The thus-determined tone values are those prepared for the relevant magnification. If the template pattern TP shown in FIG. 11A (the same as that shown in FIG. 10A) is determined to match the pixel arrangement concerning the relevant pixel, the tone value shown in FIG. 11B is determined for a pixel which serves as a pixel obtained as a result of performing the smoothing, magnifying and averaging operation on the relevant pixel for the magnification 1×1. Similarly, the tone values shown in FIG. 11C are determined for four pixels which serve as pixels obtained as a result of performing the smoothing, magnifying and averaging operation on the relevant pixel for the magnification 2×2. The tone values shown in FIG. 11D are determined for eight pixels which serve as pixels obtained as a result of performing the smoothing, magnifying and averaging operation on the relevant pixel for the magnification 2×4.

The tone values shown in FIGS. 11B and 11C correspond to the dot patterns DP shown in FIGS. 10B and 10C, respectively. Further, the tone values shown in FIGS. 11B and 11C are equal to those which are obtained as a result of the averaging operation being performed on the dot patterns DP shown in FIGS. 10B and 10C, respectively. In fact, for example, the bottom right division of the dot pattern DP shown in FIG. 10C consists of 9 dots including 7 black dots. Correspondingly, the bottom right tone value in the four tone values shown in FIG. 11C is (7/9) P.

As shown in FIG. 10D and FIG. 11D, in this embodiment, each division of the dot pattern DP shown in FIG. 10D consists of 6 dots, while each tone value of the tone values shown in FIG. 11D is (A/9)P, where "A" may be one of 10 numbers, 0 through 9. Therefore, the dot pattern DP shown in FIG. 10D does not exactly correspond to the tone value shown in FIG. 11D and thus the tone value shown in FIG. 11D is not equal to one is which is obtained as a result of the averaging operation being performed on the dot pattern DP shown in FIG. 10D. However, it is also possible that the dot pattern DP shown in FIG. 10D is modified so that each division of the dot pattern consists of 9 dots. If this modification is performed, it is possible that the resulting dot pattern DP may exactly correspond to the tone value shown in FIG. 11D and thus the tone value shown in FIG. 11D may be equal to one which is obtained as a result of the averaging operation being performed on the resulting dot patterns DP.

When a magnification to be used is determined among the magnifications, for example, 1×1, 2×2 or 2×4, as mentioned above, only tone values relevant to the thus-determined magnification are stored in a memory of the operating unit 23 so that relevant tone values stored therein can be read out for each template pattern TP. The thus-stored tone values are obtained as a result of being transferred by the above-mentioned multiple tone data transfer means 29.

The above-mentioned apparatus for processing two-tone image data according to the present invention in the page printer, which was described with reference to FIGS. 3 and 4, will now be described in detail with reference to FIGS. 3 and 12.

The template matching unit 22 includes a 5×5 pixel latch unit 25 and a 5×5 pixel TPM unit 26. The 5×5 pixel latch unit 25 obtains the two-tone image data from the page memory 15 shown in FIG. 3. The two-tone image data was obtained based on image data which was received through a facsimile function of a system such as that shown in FIG. 1. The 5×5 pixel latch unit 25 maintains 5×5 pixels of the two-tone image data at the same time. The 5×5 pixels are those which correspond to the above-mentioned pixel arrangement concerning the relevant pixel. In the unit 25, the 5×5 pixels are changed so that the relevant pixel is changed one by one in response to the obtaining of the two-tone image data. The 5×5 pixel TPM unit 26 uses various template patterns TP such as those shown in FIGS. 9A through 9F, to determine whether or not one of the template patterns TP matches the pixel arrangement of the 5×5 pixels maintained in the 5×5 pixel latch unit 25.

Figure 12:
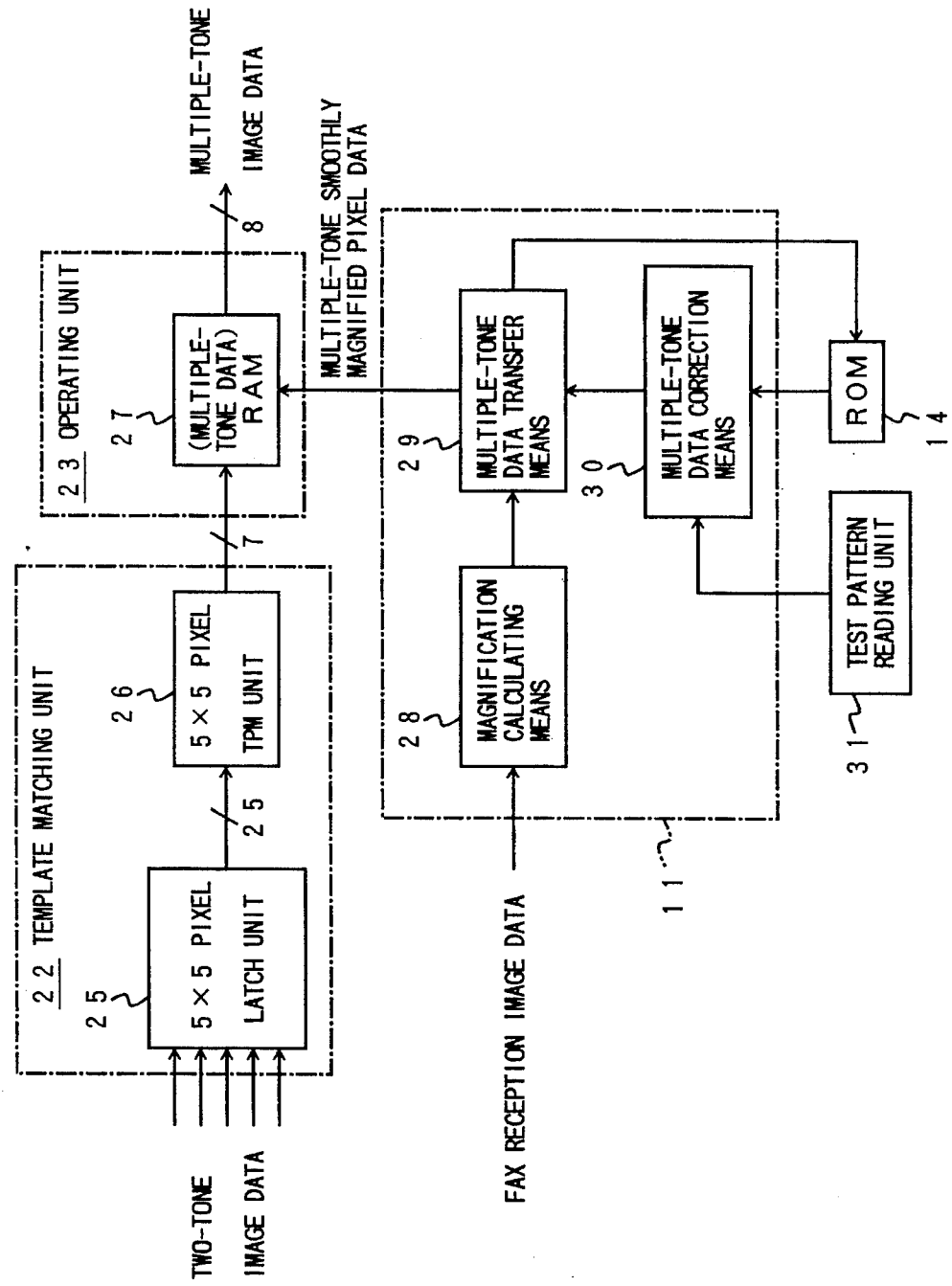
FIG. 12 shows a detailed block diagram of an apparatus for processing two-tone image data according to the present invention provided in the page printer shown in FIG. 3 and in the multiple-tone magnifying circuit shown in FIG. 4.

The operating unit 23 includes a RAM 27 as shown in FIG. 12. The RAM 27 is the above-mentioned memory which stores the above-mentioned smoothly magnified pixel data. In addition to the RAM 27, appropriate elements such as adders and other operating elements are included in the operating unit 23, even though they are not shown in the figure. Thus, the operating unit 23 operates as described above.

Figure 3:
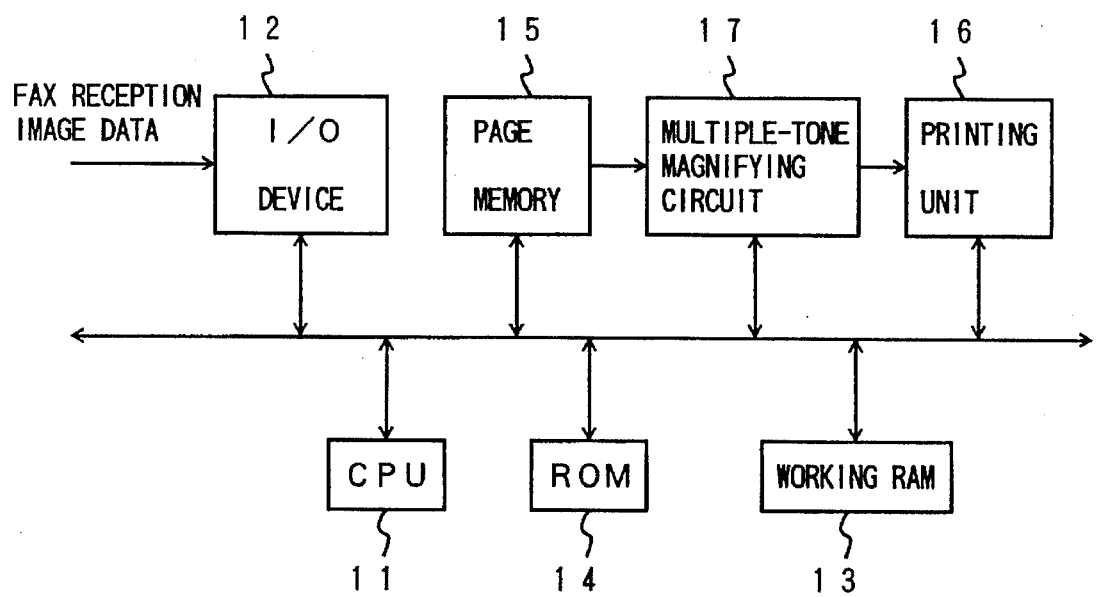
FIG. 3 shows a block diagram example of a page printer in an embodiment of the present invention.

The ROM 14, which is shown not only in FIG. 12 but also in FIG. 3, stores not only operating programs for the operation of the CPU 11 but also the above-mentioned smoothly magnified pixel data. The smoothly magnified pixel data stored in the ROM 14 includes various kinds of smoothly magnified pixel data which are different for various magnifications such as those shown in FIG. 2. The smoothly magnified pixel data may consist of either dot patterns DP such as those shown in FIGS. 10B through 10D or multiple-tone data such as those shown in FIGS. 11B through 11D.

Functions of the CPU 11, also shown in FIG. 3, include functions of magnification calculating means 28, the above-mentioned multiple-tone data transfer means 29, and multiple-tone data correction means 30 as shown in FIG. 12.

The magnification calculating means 28 selects a magnification from among the magnifications shown in FIG. 2. The selection is performed each time when a new series of image data is received through the facsimile function and input to the I/O device 12 shown in FIG. 3. The selection is performed as follows: A type of a facsimile apparatus which transmits the image data to the relevant system is determined. Further, which transmission resolution mode is used by the transmitting apparatus among modes such as an ordinary-resolution transmission mode and a fine-resolution transmission mode is determined. The fine-resolution transmission mode is, for example, a mode resulting in a facsimile transmission image having a resolution of 8×7.7 shown in FIG. 2. The ordinary-resolution transmission mode is, for example, a mode resulting in a facsimile transmission image having a resolution of 8×3.85 shown in FIG. 2. A super-fine-resolution transmission mode is, for example, a mode resulting in a facsimile transmission image having a resolution of 16×16 shown in FIG. 2. The determination is performed based on pixel density of the received image data. The above-mentioned selection is performed using the result of the above-mentioned determination and the resolution of the printer to be used in printing out the relevant image.

The multiple-tone data transfer means 29 reads the smoothly magnified pixel data from the ROM 14, which data was prepared for the magnification selected by the magnification calculating means 28. The transfer means 29 transfers the thus-read smoothly magnified pixel data to the multiple-tone correction means 30. The correction means 30 corrects the transferred smoothly magnified pixel data which data is then stored in the RAM 27 in the operating unit 23.

The correction of the correction means 30 is performed so as to obtain a printed-out image which has desired characteristics corresponding to those of the image data which is received through the facsimile function. The characteristics of the image data received through the facsimile function may be adversely affected by gamma characteristics of the relevant printer and so forth. This correction is performed based on the gamma characteristics of the relevant printer, environment variation such as ambient temperature variation, characteristics variation of a photosensitive substance drum and so forth in the printer due to aging thereof. In the present embodiment shown in FIG. 12, a test pattern reading unit 31 supplies data which is then used for the correction. The correction using the data from the test pattern reading unit 31 will be described later.

A number of the template patterns TP used by the TPM unit 26 for determining matching of them with the relevant pixel arrangement will be referred to as TPN, hereinafter. A comparison example of a structure of the operating unit 23 different from that of the operating unit 23 in the embodiment according to the present invention will now be considered for comparison. In the comparison example, a ROM is used instead of the RAM 27 shown in FIG. 12 to store all kinds of the smoothly magnified pixel data different for all possible magnifications for the printer resolution of 400 dpi shown in FIG. 2. The smoothly magnified pixel data is such as that shown in FIGS. 11B, 11C and 11D. In this comparison example, a required capacity of the ROM is calculated as follows:

For the 1×1 magnification, a capacity of 8TPN bits, calculated by TPN×(1×1)×8 =8 TPN, is required;

similarly, for the 2×2 magnification, a capacity of 32 TPN bits, calculated by TPN×(2×2)×8=32 TPN, is required; and for the 2×4 magnification, a capacity of 64 TPN bits, calculated by TPN ×(2×4)×8=64TPN, is required.

As a result, a total capacity of 104TPN bits is required for the ROM. In the above calculations, it is assumed that the data amount of 8 bits is used for each pixel which serves as a pixel obtained as a result of performing the smoothing, magnifying and averaging operation on the relevant pixel for a relevant magnification of those of 1×1, 2×2 and 2×4. Therefore, the number 8 is multiplied by a respective magnification of those 1×1 as shown in FIG. 11B, 2×2 as shown in FIG. 11C and 2×4 as shown in FIG. 11D in each calculation.

A case is assumed for each pixel which serves as the pixel obtained as a result of performing the smoothing, magnifying and averaging operation on the relevant pixel for a relevant magnification of those of 1×1, 2×2 and 2×4. In this case, a total number of tones is 10, which tones consisting of values 0, (1/9)P, . . . , (1/9)P as shown in FIGS. 11B, 11C and 11D. However an ordinary laser printer has a capability of expressing 256 multiple tones. It is necessary to supply multiple-tone image data to such a printer, which data matches the capability of the printer. Therefore, it is necessary to provide the capacity of the above-mentioned ROM determined based on the matter that the data amount of 8 bits is used for each pixel which serves as the pixel obtained as a result of performing the smoothing, magnifying and averaging operation on the relevant pixel for a relevant magnification of those of 1×1, 2×2 and 2×4. In this case, it may be that only 10 tones are used among the 256 tones actually.

The above case is based on 9 dots or 6 dots being used to represent each pixel which serves as the pixel obtained as a result of performing the smoothing, magnifying and averaging operation on the relevant pixel for a relevant magnification of those of 1×1, 2×2 and 2×4 as shown in FIGS. 10B, 10C and 10D. However, in order to advantageously reduce capacities of relevant memories, it is also possible that only two dots are used to represent each pixel which serves as the pixel obtained as a result of performing the smoothing, magnifying and averaging operation on the relevant pixel for a relevant magnification of those of 1×1, 2×2 and 2×4. In this case, 3 multiple tones are used for each pixel.

However, in the present embodiment shown in FIG. 12, in contrast to the above-descried comparison example, a RAM such as the RAM 27 is used instead of the ROM in the operating unit 23. Thereby, a capacity of only 64 TPN bits is required for the RAM 27, since the maximum capacity is that of 64 TPN bits among capacities of 8 TPN bits, 32 TPN bits and 64 TPN bits possible for the magnifications of 1×1, 2×2 and 2×4. Thus, in contrast to the capacity of 104 TPN required for the ROM of the comparison example, the capacity of the RAM 27 can be reduced. Thus, a capacity of a memory for storing the smoothly magnified pixel data is reduced. In the embodiment shown in FIG. 12, as described above, the smoothly magnified, pixel data prepared for the relevant magnification is transferred from the ROM 14 to the RAM 27, a download process being thus performed. This download process is performed each time when the magnification calculating means 28 determines the relevant magnification as a new magnification as described above. As a result of this reduction of the capacity of the memory for storing the smoothly magnified pixel data, the template matching unit 22 and operating unit 23 can be manufactured economically if they are manufactured as a semiconductor chip of an ASIC.

However, it is also possible that, as the above-described comparison example, a ROM is used instead of the RAM 27 shown in FIG. 12 to previously store all kinds of the smoothly magnified pixel data different for all possible magnifications for the printer resolution of 400 dpi shown in FIG. 2. A smoothly magnified pixel data may be selected, from the thus-stored data, relevant to a particular magnification of the facsimile received data.

Further, the 2×2 magnification is ordinarily used as a standard magnification. Therefore, it is possible that a certain transfer operation is automatically performed immediately after a power is turned ON in the relevant system. The certain transfer operation is that in which the smoothly magnified pixel data prepared for the magnification of 2×2 is transferred to the RAM 27 so as to be default data. Only if the magnification calculating unit 28 determines the magnification different from the magnification of 2×2, the smoothly magnified pixel data prepared for different magnification is transferred to the RAM 27.

Further, the smoothly magnified pixel data is produced on the assumption that a relevant printer which prints out an image using the smoothly magnified pixel data has gamma characteristics such as that shown in FIG. 13A which are linear. That is, a relationship between tones of input image data and tones of a printed-out image are linear. However, an actual printer has different gamma characteristics such as that shown in FIG. 13B. According to the gamma characteristics shown in FIG. 13B, desired tones may not be obtained, that is, tone levels are undesirably low in a part of the printed-out image in which tone levels are relatively low. Thus, desired tones may not be obtained in the printed-out image.

In the embodiment shown in FIG. 12, it is possible that the multiple-tone data correction means 30 corrects the smoothly magnified pixel data so that the adverse effects due to the difference in the gamma characteristics of the relevant printer such as that between FIG. 13A and FIG. 13B can be eliminated. Thus, the desired tones may be obtained in the printed-out image. For this purpose, the multiple-tone data correction unit 30 performs correction such as that shown in FIG. 13C on the smoothly magnified pixel data and the resulting data is stored in the RAM 27.

Further, it is also possible in the embodiment shown in FIG. 12 that actual performance in the relevant printer is detected and thus used by the multiple-tone pixel data correction means 30 to correct the smoothly magnified pixel data. For this purpose, a certain part of a photosensitive substance drum of the relevant printer is used. The certain part of the photosensitive substance drum is an extra part which is not used in an ordinary printing operation. In each printing operation, all expressible tones, for example, 256 tones are formed as a tone test pattern in the certain part of the photosensitive substance body. The thus-formed test pattern is read by the test pattern reading unit 31 shown in FIG. 12. Thus, the actual performance of the relevant printer can be detected. Using the thus-detected actual performance, the multiple-tone data correction means 30 automatically corrects the smoothly magnified pixel data to be stored in the RAM 27.

A method such as that in which the actual performance such as actual gamma characteristics is detected by using the read test pattern as described above was performed in a conventional laser printer. Therefore, a detail description of the method is omitted.

Further, it is also possible that environment variation such as temperature and/or humidity variation in the relevant printer is detected. The multiple-tone data correction means 30 uses the result of the detection and thus corrects the smoothly magnified pixel data. Further, it is also possible that an operator may input data to the relevant system through a plurality of touch switches provided on an operation panel of the system. Specifically, for example, the operator may input a specification in which tone levels obtained in the printed-out image can be arbitrarily changed. For example, all tone levels can be shifted, or only tone levels of either a high-level zone or a low-level zone of the all tone levels can be shifted.

Applications of the present invention are not limited to the page printer of the digital duplicator having the facsimile function such as that described above. The present invention can also be applied to other facsimile apparatuses and other image forming apparatuses having facsimile functions. The present invention can further be applied to an image display apparatus such as that using a CRT.

Further, the present invention is not limited to the above-described embodiments, and variations and modifications may be made without departing from the scope of the present invention.

What is claimed is:

1. An apparatus for processing two-tone image data so as to magnify a relevant image and smooth a boundary line between a zone consisting of first-tone pixels of two-tone pixels constituting said relevant image and a zone consisting of second-tone pixels of said two-tone pixels, said apparatus comprising:
 means which, for each two-tone pixel of said two-tone pixels, determines a template pattern, from among a plurality of template patterns, as matching a pixel arrangement comprising pixels located around said each two-tone pixel; and
 means for converting said each two-tone pixel into either a single multiple-tone pixel or a plurality of multiple-tone pixels, said means using a result of the determination performed by said means for the converting.

2. The apparatus according to claim 1, further comprising:
 means for determining a magnification according to which said apparatus magnifies said relevant image;
 said means, for the determining of the magnification, using image data which is received through a facsimile function and is used to obtain said two-tone image data.

3. The apparatus according to claim 2, further comprising:
 means for transferring smoothly magnified pixel data to said means, which data is previously prepared for said magnification and is used for converting said each two-tone pixel into either said single multiple-tone pixel or said plurality of multiple-tone pixel in said means.

4. The apparatus according to claim 3, further comprising:
 means for correcting said smoothly magnified pixel data so as to eliminate a difference between ideal printing-out characteristics and actual printing-out characteristics.

5. A method for processing two-tone image data so as to magnify a relevant image and smooth a boundary line between a zone consisting of first-tone pixels of two-tone pixels constituting said relevant image and a zone consisting of second-tone pixels of said two-tone pixels, said method comprising steps of:
 (a) determining, for each two-tone pixel of said two-tone pixels, a template pattern, from among a plurality of template patterns, as matching a pixel arrangement comprising pixels located around said each two-tone pixel; and
 (b) converting said each two-tone pixel into either a single multiple-tone pixel or a plurality of multiple-tone pixels, said step (b) using a result of the determination performed by said step (a) for the converting.

6. The method according to claim 5, wherein:
said step (b) further comprises steps of:
 (b-1) converting said each two-tone pixel into a two-tone dot group;
 (b-2) dividing said dot group into either a single division or a plurality of divisions; and
 (b-3) averaging tones of dots constituting appropriate one of said single division or said plurality of divisions, a result of the averaging constituting either a tone of said single multiple-tone pixel or tones of said plurality of multiple-tone pixels.

7. The method according to claim 6, wherein:
said method further comprises steps of:
 (c) classifying said plurality of template patterns into a first group of patterns, a second group of patterns and a third group of patterns;
 said first group of patterns being used to detect whether said each two-tone pixel is one not to be converted into either said single multiple-tone pixel or said plurality of multiple-tone pixels;
 said second group of patterns being used to detect whether said each two-tone pixel is one not comprising a stairstep part in said boundary line and is to be converted into either said single multiple-tone pixel or said plurality of multiple-tone pixels;
 said third group of patterns being used to detect said each two-tone pixel is one comprising said stairstep part in said boundary line and is to be converted into either said single multiple-tone pixel or said plurality of multiple-tone pixels;
 (d) determining a group priority order such that said step (a) uses a group from among said first, second and third groups of patterns in that order; and
 (e) determining a pattern priority order according to which said step (a) uses a pattern from within each group of said first, second and third groups of patterns.

8. The method according to claim 6, wherein said dot group is commonly used in said step (b-1) for different magnifications of said magnification.

9. The method according to claim 8, wherein:
 said step (b-2) divides said dot group into either said single division or said plurality of divisions in accordance with a relevant magnification of said different magnifications; and
 said dot group comprises a dot pattern such that each tone of either said tone of said single multiple-tone pixel or said tones of said plurality of multiple-tone pixels obtained in said step (b-3) from said dot group is a multiple tone.

10. The method according to claim 9, wherein, if each pixel of either said single multiple-tone pixel or said plurality of multiple-tone pixels is a pixel comprising a stairstep part of said boundary line, a tone of said each pixel is a middle tone.

11. The method according to claim 9, wherein said dot group comprises said dot pattern such that appropriate one of said single division and each of said plurality of divisions from said dot group includes at least two dots.

12. The method according to claim 6, wherein:
 different patterns of said dot group used in said step (b-1) are prepared for various magnifications of said magnification.

13. The method according to claim 6, wherein:

said step (b) further comprises a step of:

(b-4) determining each tone of either said single multiple-tone pixel or said plurality of multiple-tone pixels, which tone is different for various magnifications of said magnification for each template pattern of said plurality of template patterns.

14. The method according to claim 13, wherein:

said method further comprises steps of:

(c) classifying said plurality of template patterns into a first group of patterns, a second group of patterns and a third group of patterns;

said first group of patterns being used to detect whether said each two-tone pixel is one not to be converted into said single multiple-tone pixel or said plurality of multiple-tone pixels;

said second group of patterns being used to detect whether said each two-tone pixel is one not comprising a stairstep part in said boundary line and is to be converted into said single multiple-tone pixel or said plurality of multiple-tone pixels;

said third group of patterns being used to detect whether said each two tone pixel is one comprising said stairstep part in said boundary line and is to be converted into either said single multiple-tone pixel or said plurality of multiple-tone pixels;

(d) determining a group priority order such that said step (a) uses a group from among said first, second and third groups of patterns in that order; and (e) determining priority order according to which said step (a) uses a pattern from within each group of said first, second and third groups of patterns.

* * * * *